United States Patent
Yae

(10) Patent No.: US 12,499,877 B2
(45) Date of Patent: Dec. 16, 2025

(54) DIALOGUE SYSTEM AND METHOD FOR CONTROLLING THE SAME

(71) Applicants: Hyundai Motor Company, Seoul (KR); Kia Corporation, Seoul (KR)

(72) Inventor: Seong Soo Yae, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 375 days.

(21) Appl. No.: 18/186,665

(22) Filed: Mar. 20, 2023

(65) Prior Publication Data

US 2023/0386455 A1 Nov. 30, 2023

(30) Foreign Application Priority Data

May 25, 2022 (KR) .................. 10-2022-0064296

(51) Int. Cl.
 *G10L 15/18* (2013.01)
 *G06F 16/3329* (2025.01)
 *G10L 15/22* (2006.01)

(52) U.S. Cl.
 CPC .......... *G10L 15/18* (2013.01); *G06F 16/3329* (2019.01); *G10L 15/22* (2013.01); *G10L 2015/223* (2013.01); *G10L 2015/225* (2013.01)

(58) Field of Classification Search
 CPC .............. G10L 15/18; G10L 2015/223; G10L 2015/225; G10L 21/0232; G10L 15/22; G10L 15/30; G10L 25/60; G06F 40/20
 See application file for complete search history.

(56) References Cited

U.S. PATENT DOCUMENTS

| | | | |
|---|---|---|---|
| 8,195,468 B2 * | 6/2012 | Weider | G10L 15/1815 704/250 |
| 10,062,219 B2 * | 8/2018 | Richter | G07C 5/008 |
| 10,522,134 B1 * | 12/2019 | Matsoukas | G10L 15/30 |
| 10,629,199 B1 * | 4/2020 | Parthasarathy | G10L 19/167 |
| 10,839,797 B2 * | 11/2020 | Shin | G10L 15/1815 |
| 11,763,096 B2 * | 9/2023 | Tunstall-Pedoe | G10L 15/1815 704/9 |
| 2010/0054118 A1 * | 3/2010 | Hughes | H04L 67/562 370/216 |
| 2015/0019217 A1 * | 1/2015 | Di Cristo | G06F 16/335 704/235 |

(Continued)

FOREIGN PATENT DOCUMENTS

| | | | | |
|---|---|---|---|---|
| AU | 2014214676 A1 * | 8/2015 | | G06F 3/167 |
| CA | 3163622 A1 * | 7/2021 | | G06F 16/24578 |

(Continued)

*Primary Examiner* — Mohammad K Islam
(74) *Attorney, Agent, or Firm* — SLATER MATSIL, LLP

(57) ABSTRACT

An embodiment dialogue system includes a database, a speech recognition device configured to convert a user's speech into text, a natural language understanding device configured to determine a main domain and task corresponding to the user's speech based on the text, and a controller configured to determine a sub-domain associated with the main domain based on the database and to generate an additional query instruction related to the sub-domain, wherein the speech recognition device is further configured to receive the additional query instruction and to convert the additional query instruction into additional text.

15 Claims, 14 Drawing Sheets

(56) References Cited

U.S. PATENT DOCUMENTS

| | | | |
|---|---|---|---|
| 2018/0211663 A1* | 7/2018 | Shin | G10L 15/1815 |
| 2018/0293300 A1* | 10/2018 | Liu | G06F 40/289 |
| 2019/0027137 A1* | 1/2019 | Sohn | G10L 15/30 |
| 2019/0115017 A1* | 4/2019 | Sim | G10L 25/51 |
| 2020/0020331 A1* | 1/2020 | Kim | G10L 15/30 |
| 2020/0027283 A1* | 1/2020 | Nishikawa | G07C 5/008 |
| 2022/0118926 A1* | 4/2022 | Park | B60R 16/0373 |
| 2023/0083706 A1* | 3/2023 | Kakemura | G10L 15/22 704/246 |
| 2024/0086645 A1* | 3/2024 | Tunstall-Pedoe | G06F 40/211 |

FOREIGN PATENT DOCUMENTS

| | | | | |
|---|---|---|---|---|
| CN | 109474671 A | * | 3/2019 | G01N 33/98 |
| CN | 112000791 B | * | 2/2024 | G06F 16/3329 |
| KR | 20170051591 A | * | 5/2017 | H04L 43/50 |

* cited by examiner

FIG. 3

| MAIN DOMAIN | ASSOCIATED DOMAIN |
|---|---|
| WINDOW (DRIVER SEAT) | VEHICLE CONTROL (WINDOW) |
| WINDOW (PASSENGER SEAT) | VEHICLE CONTROL (WINDOW) |
| TRUNK | VEHICLE CONTROL (DRIVING) |
| SUNROOF | WEATHER |

FIG. 4

| MAIN DOMAIN | ASSOCIATED DOMAIN (FACTOR DOMAIN) |
|---|---|
| WEATHER | 1. WEATHER (SCHEDULE)<br>2. SCHEDULE (TODAY) |
| DESTINATION | WEATHER (DESTINATION) |
| NEWS | NEWS (SCHEDULE) |

DIALOGUE SYSTEM AND METHOD FOR CONTROLLING THE SAME

CROSS-REFERENCE TO RELATED APPLICATIONS

This application claims the benefit of Korean Patent Application No. 10-2022-0064296, filed on May 25, 2022, which application is hereby incorporated herein by reference.

TECHNICAL FIELD

The disclosure relates to a dialogue system and a method of controlling the same.

BACKGROUND

A dialogue system is a system capable of recognizing a user's voice to understand the user's intention and providing a service corresponding to the identified user's intention.

The dialogue system is linked to a specific device to control the device according to the user's intention and also provides specific information according to the user's intention.

Recently, such a system is also installed in a vehicle, so that the user can control the vehicle only by speaking and can obtain desired information or receive desired service through dialogue with the vehicle.

Conventionally, if a user speaks a specific instruction, only a result corresponding to the instruction spoken by the user is provided, and a speech recognition scenario is terminated.

In addition, if a speech guidance is provided to inform the user of a schedule and the like that the user has saved in advance, the speech guidance is suddenly executed, resulting in a situation in which a user who is driving is surprised or embarrassed by the sudden speech guidance.

Also, in order to generate a new speech recognition scenario in order to provide additional information to the user, there is a problem in that a development cost increases because it is necessary to generate and learn a new instruction.

SUMMARY

The disclosure relates to a dialogue system and a method of controlling the same. Particular embodiments relate to a dialogue system and control method thereof capable of interacting with a user.

According to one embodiment of the present disclosure, a dialogue system and control method thereof are provided that can additionally provide information that can be helpful to a user by identifying a domain corresponding to a user's speech and providing information about a sub-domain associated thereto.

In addition, according to one embodiment of the disclosure, a dialogue system and control method thereof are provided that allow a user to prepare for a future event in advance by providing a schedule or destination stored by the user together with a response corresponding to the user's speech.

In addition, according to one embodiment of the disclosure, a dialogue system and control method thereof are provided that can reduce development costs by using an instruction system used in an existing speech recognition system as it is to generate and learn a new instruction and can develop new speech recognition scenarios.

A dialogue system according to an embodiment may include a database, a speech recognition module configured to convert a user's speech into text, a natural language understanding module configured to determine a main domain and task corresponding to the user's speech based on the text, and a controller configured to determine a sub-domain associated with the main domain based on the database and to generate an additional query instruction related to the sub-domain, wherein the speech recognition module may be further configured to receive the generated additional query instruction and convert the received additional query instruction into additional text.

The dialogue system may further include a response generating module configured to generate a response, wherein the natural language understanding module may be further configured to perform natural language recognition based on the converted additional text, and the response generating module may be further configured to generate a response corresponding to the user's speech and a response corresponding to the additional query instruction together.

The controller may be further configured to determine the sub-domain based on a priority stored in advance in the database.

Upon determining that the main domain is related to a vehicle, the controller may be further configured to determine whether the user's speech is related to performing control of the vehicle.

Upon determining that the user's speech is related to performing control of the vehicle, the controller may be further configured to perform control of the vehicle corresponding to the user's speech and to control the response generating module to generate the response corresponding to the additional query instruction.

Upon determining that it is necessary to provide feedback on the control of the vehicle corresponding to the user's speech, the controller may be further configured to control the response generating module to generate the feedback on the control of the vehicle and the response corresponding to the additional query instruction together.

Upon determining that the user's speech is not related to performing control of the vehicle, the controller may be further configured to control the response generating module to generate the response corresponding to the user's speech and the response corresponding to the additional query instruction together.

Upon determining that the main domain is not related to a vehicle, the controller may be further configured to determine whether there is a schedule or destination stored in advance by the user.

Upon determining that the pre-stored schedule or destination exists, the controller may be further configured to control the response generating module to generate the response corresponding to the user's speech and information about the stored schedule or destination together.

A method for controlling a dialogue system according to an embodiment may include converting a user's speech into text, determining a main domain and task corresponding to the user's speech based on the text, determining a sub-domain associated with the main domain based on a database, generating an additional query instruction related to the sub-domain, and converting the generated additional query instruction into additional text.

The method may further include performing natural language recognition based on the converted additional text and generating a response corresponding to the user's speech and a response corresponding to the additional query instruction together.

The determining the sub-domain may include determining the sub-domain based on a priority stored in advance in the database.

The method may further include determining whether the user's speech is related to performing control of a vehicle upon determining that the main domain is related to the vehicle.

The method may further include performing control of the vehicle corresponding to the user's speech upon determining that the user's speech is related to performing control of the vehicle, wherein the generating the response may include generating the response corresponding to the additional query instruction.

The generating the response may include generating feedback on the control of the vehicle and the response corresponding to the additional query instruction together upon determining that it is necessary to provide the feedback on the control of the vehicle corresponding to the user's speech.

The generating the response may include generating the response corresponding to the user's speech and the response corresponding to the additional query instruction together upon determining that the user's speech is not related to performing control of the vehicle.

The method may further include determining whether there is a schedule or destination stored in advance by the user upon determining that the main domain is not related to a vehicle.

The generating the response may include generating the response corresponding to the user's speech and information about the stored schedule or destination together upon determining that the pre-stored schedule or destination exists.

BRIEF DESCRIPTION OF THE DRAWINGS

FIG. 3 is a diagram illustrating a sub-domain in a case that a main domain relates to a vehicle according to an embodiment.

FIG. 4 is a diagram illustrating a sub-domain in a case that a main domain relates to other than a vehicle according to an embodiment.

Figure 1:
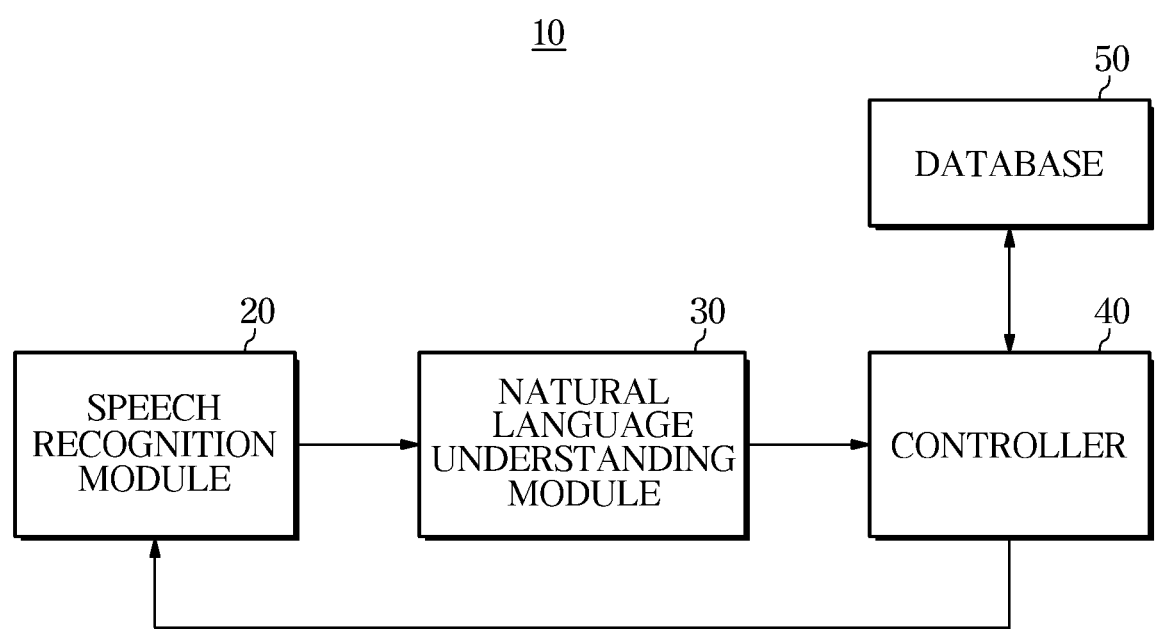
FIG. 1 is a diagram illustrating a control block diagram of a dialogue system according to an embodiment.

The following reference identifiers may be used in connection with the accompanying drawings to describe exemplary embodiments of the present disclosure.

1: vehicle
10: dialogue system
20: speech recognition module
30: natural language understanding module
40: controller
41: processor
42: memory
50: database
60: response generating module
210: microphone
220: speaker
230: ECU

DETAILED DESCRIPTION OF ILLUSTRATIVE EMBODIMENTS

Like reference numerals refer to like components throughout the specification. This specification does not describe all components of the embodiments, and general content in the technical field to which the disclosure pertains or content overlapping between the embodiments is omitted. The terms 'unit, module, member, block' used in the specification may be implemented in software or hardware, and according to embodiments, a plurality of 'units, modules, members, blocks' may be implemented as a single component, or one 'unit, module, member, block' may include a plurality of components.

Throughout the specification, when a part is "connected" with another part, it includes not only a direct connection but also an indirect connection, and the indirect connection includes connection through a wireless communication network.

Also, when a part "includes" a certain component, it means that other components may be further included, rather than excluding other components, unless otherwise stated.

Throughout the specification, when a member is said to be located "on" another member, this includes not only a case in which a member is in contact with another member but also a case in which another member exists between the two members.

Terms such as first, second, etc. are used to distinguish one component from another component, and the component is not limited by the above-mentioned terms.

The singular expression includes the plural expression unless the context clearly dictates otherwise.

In each step, the identification code is used for convenience of description, and the identification code does not describe the order of each step, and each step may be performed differently from the specified order unless the specific order is clearly stated in the context.

Hereinafter, the working principle and embodiments of the disclosure will be described with reference to the accompanying drawings.

FIG. 1 is a diagram illustrating a control block diagram of a dialogue system according to an embodiment.

The dialogue system 10 may include a speech recognition module 20, a natural language understanding module 30, a database 50, and a controller 40.

The speech recognition module 20 may convert the user's speech into text.

The speech recognition module 20 may be implemented as a speech to text (SIT) engine, and may convert speech into text by applying a speech recognition algorithm to the speech signal.

For example, the speech recognition module 20 may apply a feature vector extraction technology such as a cepstrum, a linear predictive coding (LPC), a mel frequency cepstral (MFCC), filter bank energy, etc. to extract a feature vector from a speech signal.

Then, the recognition result can be obtained by comparing the extracted feature vector with a trained reference pattern. To this end, an acoustic model for modeling and comparing signal characteristics of speech or a language model for modeling a linguistic order relationship such as words or syllables corresponding to a recognized vocabulary may be used.

In addition, the speech recognition module 20 may convert a speech signal into text based on a training to which machine learning or deep learning is applied. In the present embodiment, there is no limitation on the method in which the speech recognition module 20 converts a speech signal into text, and the speech recognition module 20 may convert a speech signal into text by applying various speech recognition technologies in addition to the above-described method.

The recognition result of the speech recognition module 20, that is, the text converted from the speech signal may be input to a natural language understanding module 30. The natural language understanding module 30 may apply a natural language understanding (NLU) technology to determine user intention included in input text. Accordingly, the natural language understanding module 30 may include an NLU engine that determines user intention by applying NLU technology to the input text.

For example, the natural language understanding module 30 may recognize an entity name from the input text. The entity name is a proper noun such as a person's name, a place name, an organization name, time, date, money, etc., and the recognition of the entity name is the task of identifying the entity name in a sentence and determining the type of the identified entity name. Through the recognition of the entity name, important keywords can be extracted from sentences and the meaning of sentences can be grasped.

Also, the natural language understanding module 30 may determine a main domain from the input text. The domain is a classification of the subject of the user's speech, and for example, domains representing various subjects such as air conditioning control, multimedia control, exiting notification, door control, window control, etc. may be determined based on the input text.

Also, the natural language understanding module 30 may analyze a speech act of the input text. The analysis of the speech act is the task of analyzing the intention of the speech, and it is to identify the intention of the speech, such as whether the user asks a question, makes a request, responds, or expresses a simple emotion.

A natural language interpreter may determine an intent and an entity necessary to perform the intent based on information such as a domain, an entity name, a speech act, etc. extracted from the input text.

For example, if the input text is "Please turn on the air conditioner", the domain becomes [control of air conditioner], and the intent may be [turn on. air conditioner], and an entity required to perform control corresponding to the corresponding intent may be [temperature, air volume].

As another example, if the input text is "play a song", the domain becomes [multimedia control], and the intent is [play. song], and the entity required to perform control corresponding to the corresponding intent may be [singer, song name].

An action finally performed in response to a user's speech may be defined by an intent and an entity, and in this embodiment, an action defined by the intent and the entity will be referred to as a task.

However, classification criteria, names, etc. of domains, intents, etc. may vary depending on the system. Therefore, even if a term different from the term used in the embodiment or a different classification criterion is used, it may be included in the scope of the disclosure.

The database 50 may store various data related to a domain. For example, information about various domains and information about a domain having a high degree of relevance to a specific domain may be stored with priority.

The controller 40 may search the database 50 for a sub-domain associated with the main domain determined by the natural language understanding module 30 and determine a sub-domain associated with the main domain based on the search result.

Also, the controller 40 may generate an additional query instruction related to such a sub-domain. Such an instruction may be generated in the form of a speech file and input to the speech recognition module 20 to be converted into additional text as will be described later.

The above-described dialogue system 10 may be implemented by at least one memory storing a program for performing the above-described operation and at least one processor executing the stored program.

The components of the dialogue system 10 illustrated in FIG. 1 are classified based on their operations or functions, and all or some of them may share a memory or a processor. That is, it does not necessarily mean that the speech recognition module 20, the natural language understanding module 30, and the controller 40 are physically separated components.

Figure 2:
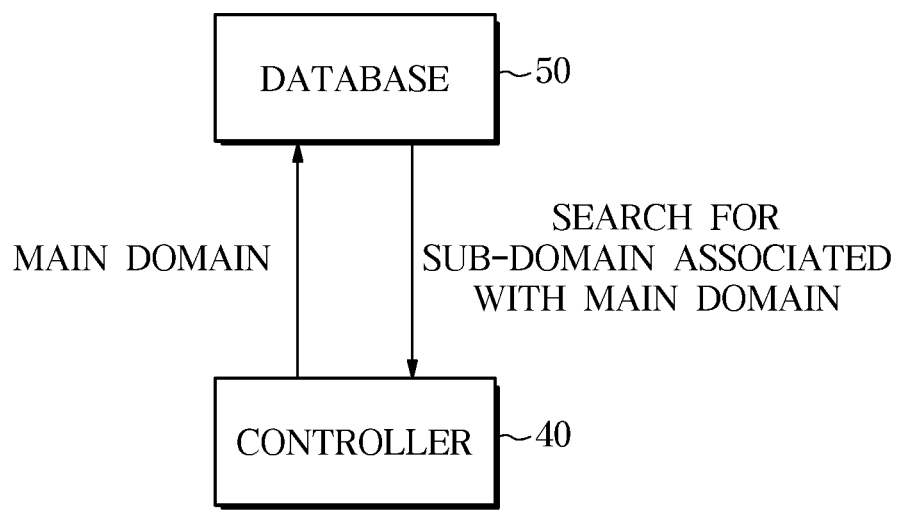
FIG. 2 is a diagram illustrating determining a sub-domain associated with a main domain in a dialogue system according to an embodiment.

FIG. 2 is a diagram illustrating determining a sub-domain associated with a main domain in a dialogue system according to an embodiment, and FIGS. 3 and 4 are diagrams illustrating a sub-domain according to a main domain according to an embodiment.

As described above, if the natural language understanding module 30 determines a domain corresponding to the user's speech, the controller 40 may search for a sub-domain associated with the main domain based on the contents stored in the database 50.

FIG. 3 illustrates a sub-domain in a case that a main domain relates to a vehicle.

For example, in a case that the main domain corresponding to the user's speech is a window (driver seat), the controller 40 may determine an associated domain as 'control (window) of a vehicle 1' based on the contents stored in the database 50.

In addition, in a case that the main domain corresponding to the user's speech is a sunroof, the controller 40 may determine an associated domain as 'weather' based on the contents stored in the database 50.

Information about the associated domain is previously stored in the database 50, and if there are a plurality of related domains, priority information may be stored together.

Accordingly, if a plurality of domains related to a specific main domain is searched for, the controller 40 may determine a domain having the highest priority as a sub-domain based on the priority information stored together.

FIG. 4 illustrates a sub-domain in the case where a main domain relates to other than a vehicle.

For example, in a case that a main domain corresponding to the user's speech is weather, the controller 40 may determine the associated domain as 'weather (schedule)' based on the contents stored in the database 50.

That is, in a case that the user makes a speech about the weather, the controller 40 may provide the user with information about the weather of a place corresponding to the user's schedule stored in advance.

Also, in a case that the main domain corresponding to the user's speech is news, the controller 40 may determine an associated domain as 'news (schedule)' based on the contents stored in the database 50.

That is, in a case that the user makes a speech about news, the controller 40 may provide the user with information about news related to the user's schedule stored in advance.

In this way, the controller 40 may determine the associated domain related to the main domain as a sub-domain and may generate an additional query instruction related to the sub-domain as described above.

As will be described later, by providing the user with a response to a generated additional query instruction, the user can be provided with helpful information without a separate request.

Figure 5:
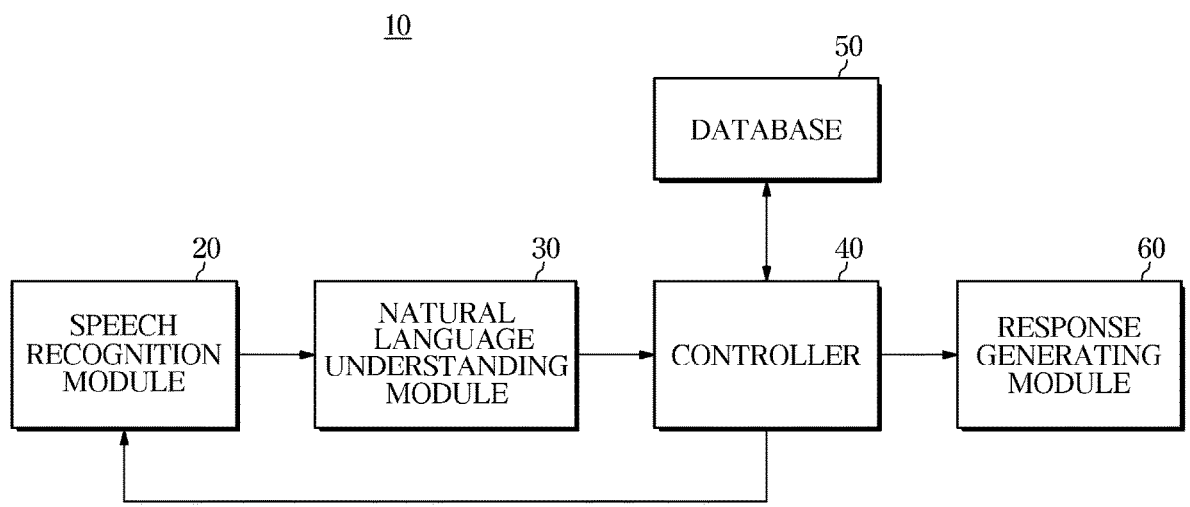
FIG. 5 is a diagram illustrating a control block diagram of a dialogue system according to an embodiment.
Figure 6:
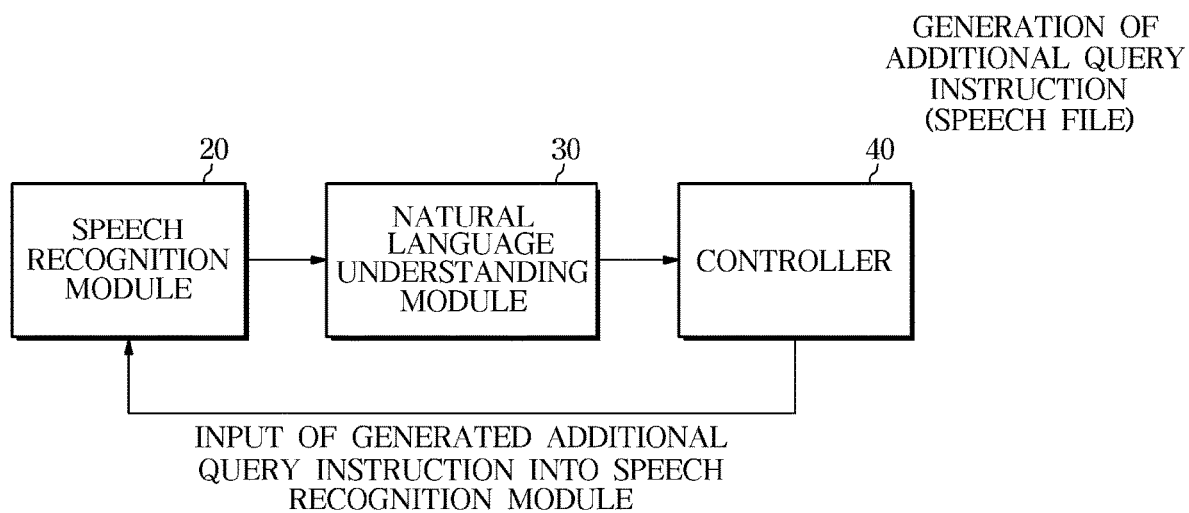
FIG. 6 is a diagram illustrating that an additional query instruction generated by a controller is input to a speech recognition module according to an embodiment.

FIGS. 5 and 6 are diagrams illustrating a control block diagram of a dialogue system according to an embodiment.

The dialogue system 10 may further include a response generating module 60.

As described above, if the controller 40 determines a sub-domain, an additional query instruction related to the sub-domain may be generated in the form of a speech file or the like, and this speech file may be converted into additional text by the speech recognition module 20.

The natural language understanding module 30 may perform natural language recognition on the converted additional text.

The response generating module 60 may generate both a response corresponding to the user's speech and a response corresponding to the above-described additional query instruction.

The converted response speech may be output to the outside through a speaker 220.

The response generating module 60 may generate a response based on response data stored in the database 50 upon generating the response. The database 50 may store the response data corresponding to the user's speech. Upon generating a response, the response generating module 60 may generate a response based on the response data stored in the database 50.

Figure 7:
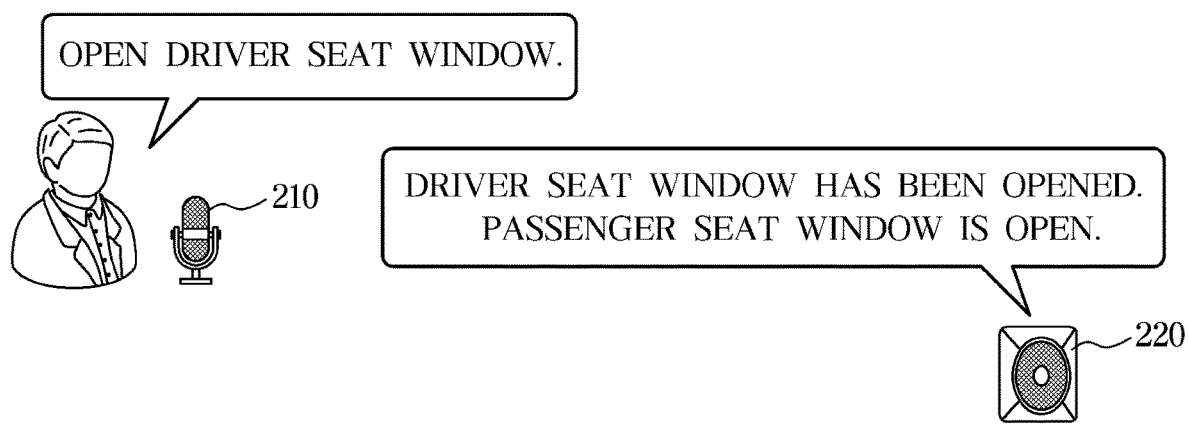
FIG. 7 is a diagram illustrating outputting a response corresponding to a user's speech and a response corresponding to an additional query instruction according to an embodiment.
Figure 8:
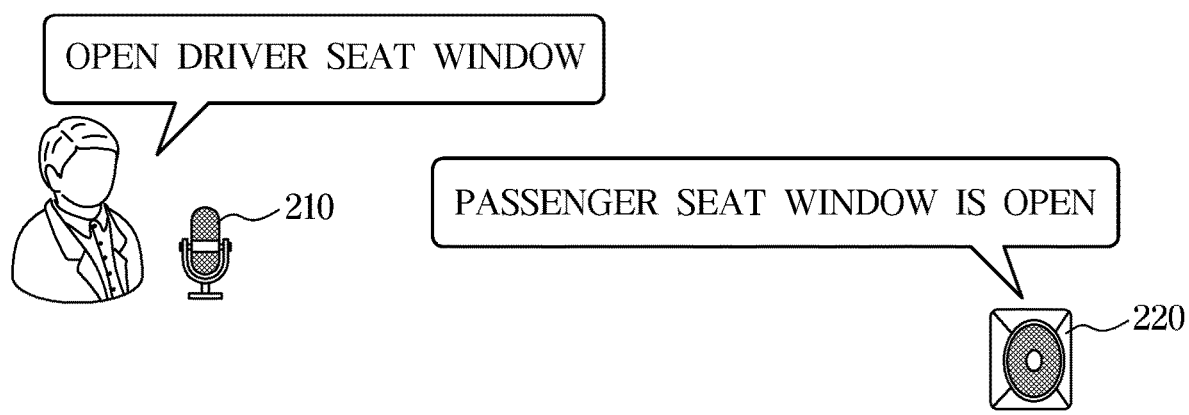
FIG. 8 is a diagram illustrating outputting only a response corresponding to an additional query instruction according to an embodiment.
Figure 9:
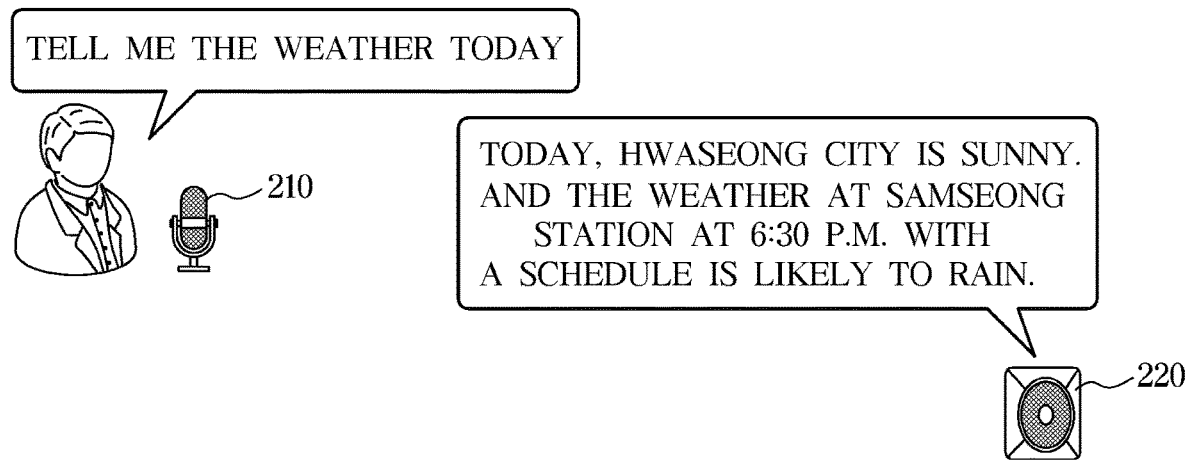
FIG. 9 is a diagram illustrating outputting a response corresponding to a user's speech and a response corresponding to an additional query instruction according to an embodiment.
Figure 10:
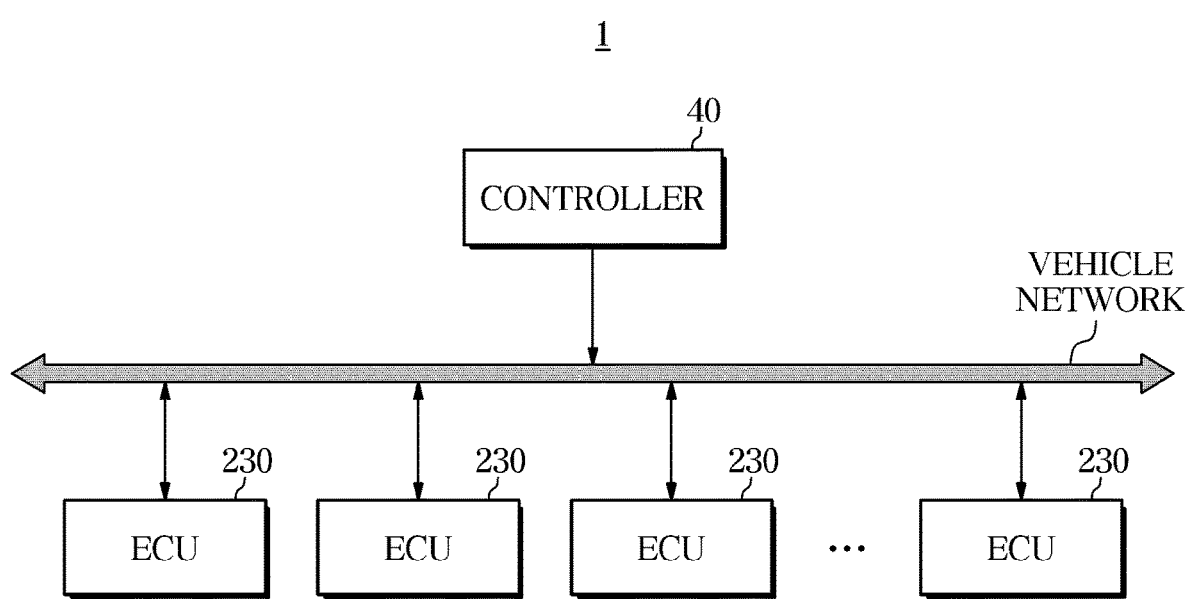
FIG. 10 is a diagram illustrating that a controller controls a plurality of ECUs for vehicle control according to an embodiment.

FIGS. 7 to 9 are diagrams illustrating outputting a response in response to a user's speech, and FIG. 10 is a diagram illustrating that a controller controls a plurality of ECUs for vehicle control according to an embodiment.

If the main domain corresponding to the user's speech is determined by the natural language understanding module 30, the controller 40 may determine whether the determined main domain relates to the vehicle 1.

Upon determining that the main domain is related to the vehicle 1, it may be determined whether the user's speech is related to performing control of the vehicle 1.

That is, in a case that the user makes a speech such as "Open the driver seat window", the controller 40 has to control the vehicle 1 to open the window located on the driver seat side. In this case, the controller 40 may determine that the user's speech is related to performing control of the vehicle 1.

However, in a case that the user makes a speech such as "Tell me the status of the rear seat window", information about whether the rear seat window is opened or not is provided to the user, and since it is not necessary to control the vehicle 1 separately, in this case, the controller 40 may determine that the user's speech is not related to performing control of the vehicle 1.

Upon determining that the user's speech is related to performing control of the vehicle 1, the controller 40 may control a plurality of ECUs 230 to perform control of the vehicle 1 corresponding to the user's speech.

For example, in a case that the user makes a speech such as "Open the driver seat window", since it is necessary to control the vehicle 1 to open the window located on the driver seat side, the controller 40 may control the related ECU 230 to open the window.

The controller 40 and the plurality of ECUs 230 may communicate with each other through a communication network in the vehicle 1. For example, electronic components may transmit and receive data through Ethernet, media oriented systems transport (MOST), Flexray, controller area network (CAN), local interconnect network (LIN), and the like.

Thereafter, the controller 40 may control the response generating module 60 to generate a response corresponding to an additional query instruction.

That is, in a case that the user speaks "Open the driver seat window", the controller 40 may control the plurality of ECUs 230 to open the driver seat window according to a user's instruction, and may generate an additional query instruction related to a determined sub-domain.

In the case of FIG. 7, a main domain called a window (driver seat) may be determined from the user's speech, and a sub-domain of the control (window) of the vehicle 1 may be determined from the determined main domain.

The controller 40 may generate an additional query instruction based on this sub-domain, and may generate an additional query instruction such as "Tell me the status of the passenger seat window" as a speech file.

Such a speech file may generate a response corresponding to an additional query instruction in the response generating module 60 through the speech recognition module 20 and the natural language understanding module 30 as described above.

In this case, a response such as "The passenger seat window is open" can be generated and output in response to an additional query instruction "Tell me the status of the passenger seat window".

Upon performing control of the vehicle 1 in response to the user's speech, there may be a case where it is necessary to inform the user of the result of the control.

For example, in a case that the user makes a speech such as "Open the driver seat window" and the driver seat window is opened in response to this, in order to notify the user of this state, that is, in the case of determining that feedback on the control of the vehicle 1 corresponding to the user's speech is necessary, the controller 40 may control the response generating module 60 to both generate feedback related to the control of the vehicle 1 and a response corresponding to an additional query instruction.

That is, in a case that the driver seat window is opened in response to the user's speech such as "Open the driver seat window" as illustrated in FIG. 7, in order to notify the user of the result of performing such a control, feedback such as "The driver seat window has been opened" can be generated and provided to the user.

Therefore, by generating and outputting the feedback on the control and the response corresponding to the above-mentioned additional query instruction, a response such as "The driver seat window has been opened. The passenger seat window is open" may be output.

Upon determining that the user's speech is not related to the control of the vehicle 1, the controller 40 may control the response generating module 60 to generate a response corresponding to the user's speech and a response corresponding to an additional query instruction together.

In other words, in a case that the user's speech is "Tell me the status of the rear seat window", since it is only necessary to provide the user with information about whether the rear seat window is open, etc., and there is no need to perform separate control, a response corresponding to the user's instruction and a response corresponding to the above-described additional query instruction may be generated and outputted together to provide the information to the user.

Upon determining that a main domain is not related to the vehicle 1, the controller 40 may determine whether there is a schedule or destination previously stored by the user.

In a case that it suddenly guides a schedule, etc. that the user has stored in advance, there may be a situation where the user who is driving may be surprised or embarrassed by the sudden guidance. Therefore, to solve this problem, if the user makes a specific speech for speech recognition, the user will be ready to hear the result of the speech. Thus, in this case, it is possible to provide a response corresponding to the user's instruction and at the same time provide information about a schedule, etc. that the user has stored in advance.

Accordingly, upon determining that there is a pre-stored schedule or destination, the controller 40 may control the response generating module 60 to generate a response corresponding to the user's speech and information about the stored schedule or destination together.

For example, as shown in FIG. 9, in a case that the user makes a speech such as "Tell me the weather today", a main domain may be determined as "weather", and a related sub-domain may be determined as "weather (schedule)".

In this case, in response to the instruction spoken by the user, a response such as "Today, Hwaseong City is sunny" may be generated.

In addition, in relation to the sub-domain which is "weather (schedule)", an additional query instruction such as "Tell me the weather at the place with today's schedule" may be generated.

Such an instruction may be generated in the form of a speech file and the like as described above, and the response generation module 60 through the speech recognition module 20 and the natural language understanding module 30 may generate a response corresponding to an additional query instruction such as "The weather at Samseong Station at 6:30 pm with a schedule is likely to rain".

In a case that the response corresponding to the user's speech and the response corresponding to the additional query instruction are output together, the output response may be unnatural if there is no transition word, etc. Thus, a transition word such as "and" may be fixedly combined between the response corresponding to the user's speech and the response corresponding to the additional query instruction to make the response more natural.

Therefore, in the case of FIG. 9, the dialogue system 10 may generate and output a response such as "Today, Hwaseong City is sunny. And the weather at Samseong Station at 6:30 p.m. with a schedule is likely to rain."

As described above, the user may be provided with information about related contents without directly speaking an instruction, and a situation in which a user is surprised or embarrassed while driving may not occur because he/she does not suddenly receive a notification regarding a schedule, etc.

Figure 11:
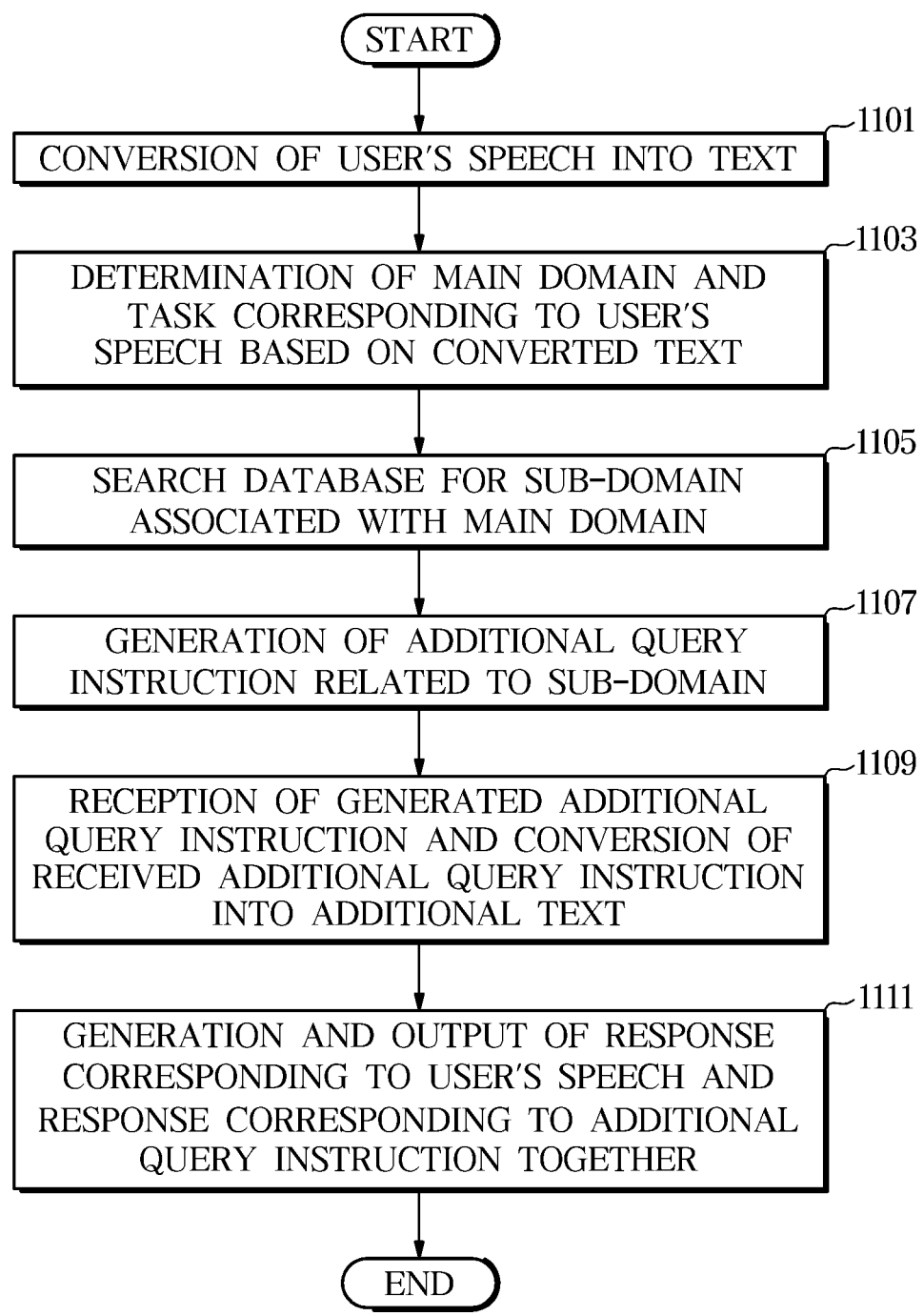
FIG. 11 is a flowchart illustrating a method for controlling a dialogue system according to an embodiment.

FIG. 11 is a flowchart illustrating a method for controlling a dialogue system according to an embodiment.

Upon the input of the user's speech, the speech recognition module 20 may convert the user's speech into text (1101). The speech recognition module 20 may be implemented as a speech to text (SIT) engine and may convert the speech into text by applying a speech recognition algorithm to a speech signal.

Thereafter, the natural language understanding module 30 may determine a main domain and task corresponding to the user's speech based on the converted text (1103).

The controller 40 may search the database 50 for a sub-domain associated with the main domain determined by the natural language understanding module 30 and determine a sub-domain associated with the main domain based on the search result (1105). Thereafter, an additional query instruction related to the sub-domain may be generated (1107).

The speech recognition module 20 may receive the generated additional query instruction and convert the received additional query instruction into additional text (1109).

Thereafter, the response generating module 60 may generate and output a response corresponding to the user's speech and a response corresponding to the additional query instruction together (1111).

Figure 12:
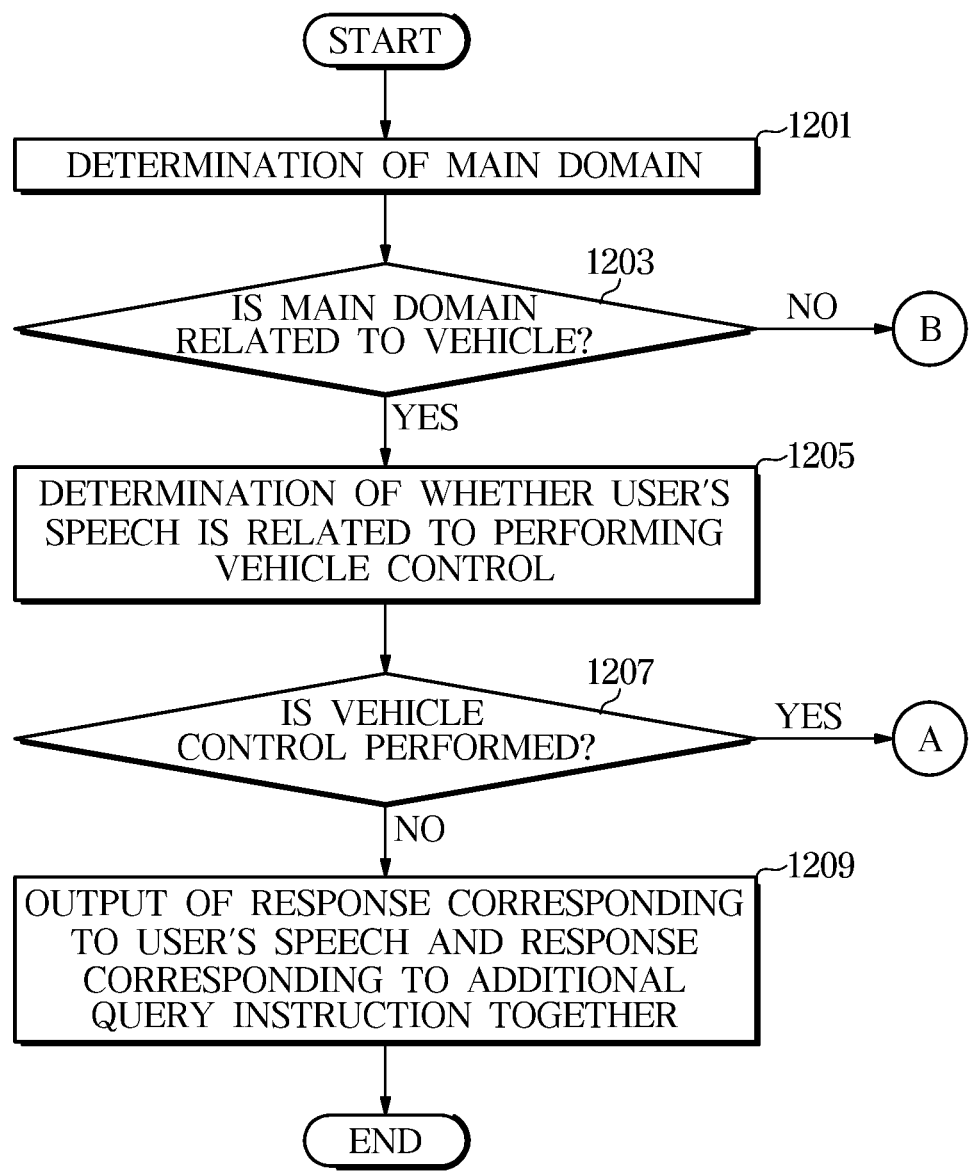
FIG. 12 is a flowchart illustrating a method for controlling a dialogue system according to an embodiment.
Figure 13:
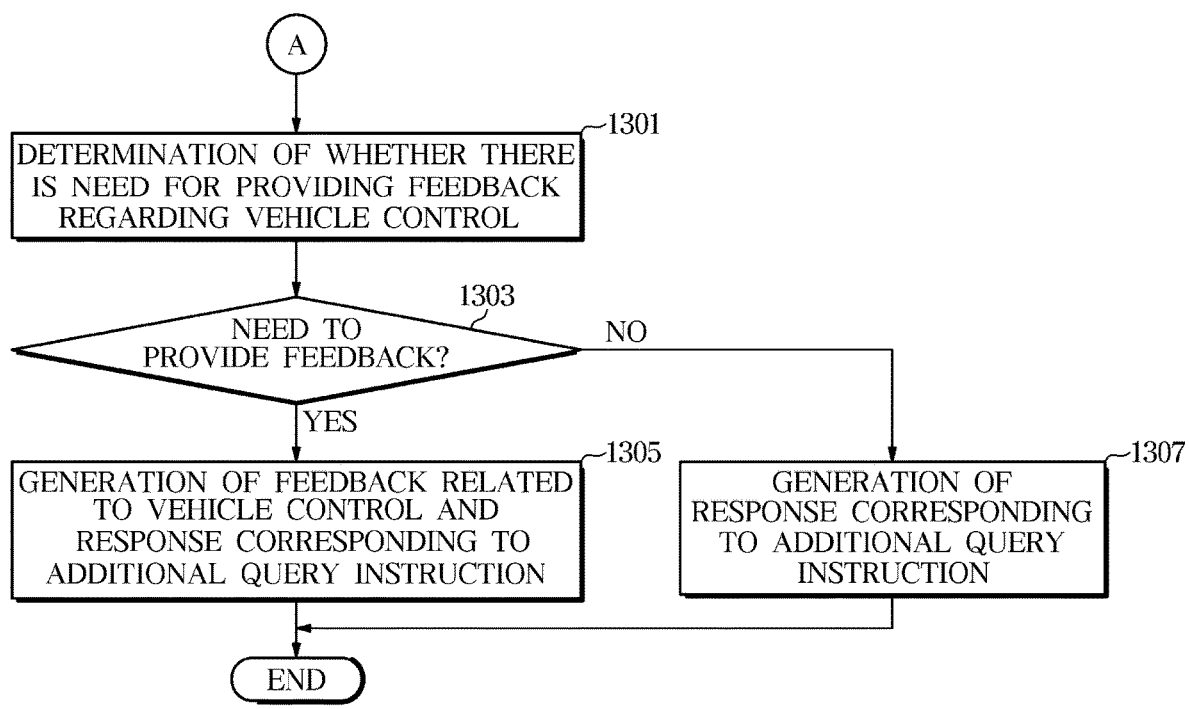
FIG. 13 is a flowchart illustrating a method for controlling a dialogue system according to an embodiment.
Figure 14:
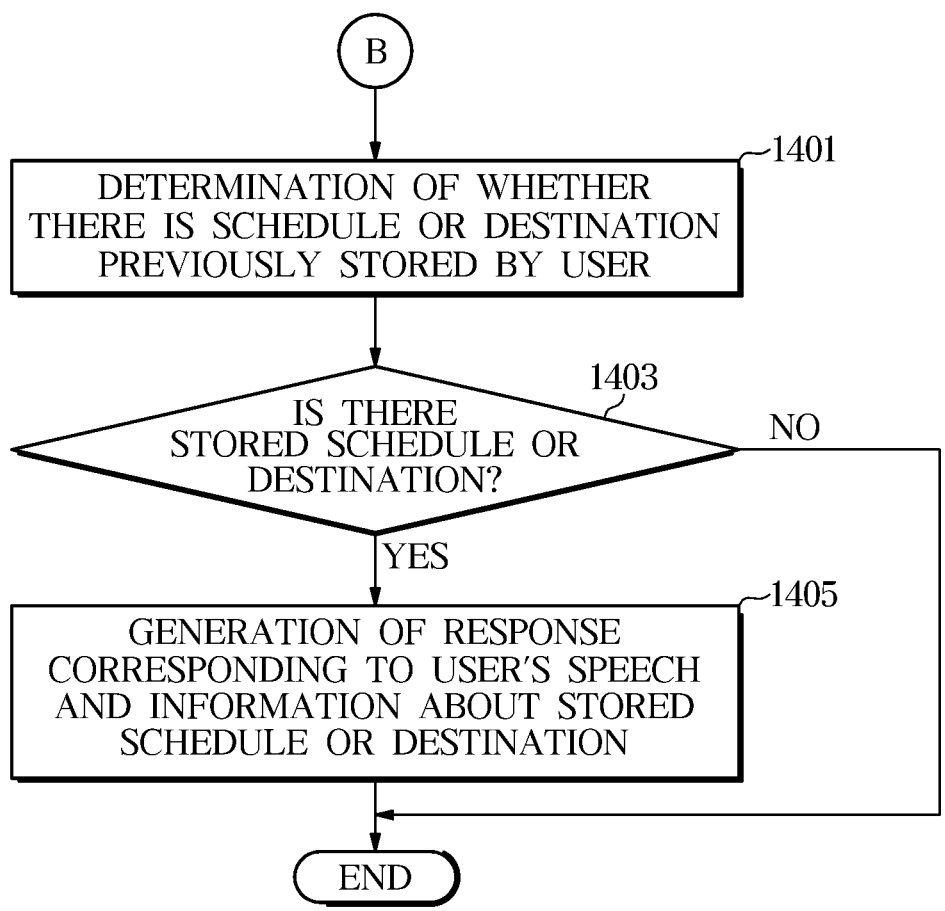
FIG. 14 is a flowchart illustrating a method for controlling a dialogue system according to an embodiment.

FIGS. 12 to 14 are flowcharts illustrating a method for controlling a dialogue system according to an embodiment.

As described above, the natural language understanding module 30 may determine a main domain corresponding to the user's speech (1201).

If the main domain corresponding to the user's speech is determined by the natural language understanding module 30, the controller 40 may determine whether the determined main domain relates to the vehicle 1.

As a result of the determination, upon determining that the main domain is related to the vehicle 1 (YES in 1203), it may be determined whether the user's speech is related to performing control of the vehicle 1 (1205).

Upon determining that the user's speech is not related to performing control of the vehicle 1 (No in 1207), a response corresponding to the user's speech and a response corresponding to an additional query instruction may be generated together (1209).

In other words, in a case that the user's speech is "Tell me the status of the rear seat window", since it is only necessary to provide the user with information about whether the rear seat window is open, etc., and there is no need to perform separate control, a response corresponding to the user's instruction and a response corresponding to the above-described additional query instruction may be generated and outputted together to provide the information to the user.

Upon determining that the user's speech is related to performing the control of the vehicle 1 (Yes in 1207), since there is a case where it is necessary to inform the user of the result of the control, it may be determined whether there is need for providing feedback regarding the control of the vehicle 1 (1301).

Upon determining that it is necessary to provide feedback (YES in 1303), feedback related to control of the vehicle 1 and a response corresponding to an additional query instruction may be generated together (1305).

For example, in a case that the user makes a speech such as "Open the driver seat window" and the driver seat window is opened in response to this, in order to notify the user of this state, that is, in the case of determining that feedback on the control of the vehicle 1 corresponding to the user's speech is necessary, the controller 40 may control the response generating module 60 to both generate feedback related to the control of the vehicle 1 and a response corresponding to the additional query instruction.

Therefore, by generating and outputting the feedback on the corresponding control and the response corresponding to the above-mentioned additional query instruction together, a response such as "The driver seat window has been opened. The passenger seat window is open." may be output.

Upon determining that it is not necessary to provide feedback (No in 1303), only a response corresponding to the additional query instruction may be generated and provided to the user (1307).

Upon determining that the main domain is not related to the vehicle 1 (No in 1203), the controller 40 may determine whether there is a schedule or destination previously stored by the user (1401).

In a case that it suddenly guides a schedule or etc. that the user stores in advance, there may be a situation where the user who is driving may be surprised or embarrassed by the sudden guidance. Therefore, to solve this problem, if the user makes a specific speech for speech recognition, the user will be ready to hear the result of the speech, and in this case, it is possible to provide a response corresponding to the user's instruction and at the same time provide information about a schedule, etc. that the user has stored in advance.

Therefore, upon determining that there is a pre-stored schedule or destination (YES in 1403), the controller 40 may control the response generating module 60 to generate a response corresponding to the user's speech and information about the stored schedule or destination together (1405).

According to embodiments of the disclosure, it is possible to additionally provide information that can be helpful to the user by identifying a domain corresponding to a user's speech and providing information about a sub-domain associated thereto. In addition, by providing a schedule or destination stored by the user together with a response corresponding to the user's speech, the user may be able to prepare for a future schedule in advance. In addition, it is possible to reduce the development cost of generating and learning a new instruction by using the instruction system used in the existing speech recognition system as it is.

According to a dialogue system and a control method thereof according to an embodiment, it is possible to additionally provide information that can be helpful to a user by identifying a domain corresponding to a user's speech and providing information about a sub-domain associated thereto.

In addition, by providing a schedule or destination stored by a user together with a response corresponding to a user's speech, the user may be able to prepare for a future schedule in advance.

In addition, it is possible to reduce the development cost of generating and learning a new instruction by using the instruction system used in the existing speech recognition system as it is.

The disclosed embodiments have been described with reference to the accompanying drawings as described above. Those of ordinary skill in the art to which the present disclosure pertains will understand that the present disclosure may be practiced in other forms than the disclosed embodiments without changing the technical spirit or essential features of the present disclosure. The disclosed embodiments are illustrative and should not be construed as limiting.

What is claimed is:

1. A dialogue system comprising:
a database; and
a processor configured to:
  convert a user's speech into text;
  determine a main domain and task corresponding to the user's speech based on the text;
  determine a sub-domain associated with the main domain based on the database;
  generate an additional query instruction related to the sub-domain; and
  convert the additional query instruction into additional text,
wherein the processor is further configured to:
  in response to a determination that the main domain is not related to a vehicle, determine whether there is a pre-stored upcoming schedule;
  in response to a determination that the pre-stored upcoming schedule exists, generate the additional query instruction relating to information associated with the pre-stored upcoming schedule based on the sub-domain; and
  generate a response corresponding to the user's speech and the information corresponding to the additional query instruction in association with the pre-stored upcoming schedule together.

2. The dialogue system of claim 1, wherein:
the processor is further configured to perform natural language recognition based on the additional text.

3. The dialogue system of claim 1, wherein, based on a determination that the main domain is related to the vehicle, the processor is further configured to determine whether the user's speech is related to performing control of the vehicle.

4. The dialogue system of claim 3, wherein, based on a determination that the user's speech is related to performing control of the vehicle, the processor is further configured to:
  perform control of the vehicle corresponding to the user's speech; and
  generate the response corresponding to the additional query instruction.

5. The dialogue system of claim 4, wherein, in response to a determination that it is necessary to provide feedback on the control of the vehicle corresponding to the user's speech, the processor is further configured to generate the feedback on the control of the vehicle and the response corresponding to the additional query instruction together.

6. The dialogue system of claim 3, wherein, in response to a determination that the user's speech is not related to performing control of the vehicle, the processor is further configured to generate the response corresponding to the user's speech and the response corresponding to the additional query instruction together.

7. The dialogue system of claim 1, wherein the processor is further configured to determine the sub-domain based on a priority stored in advance in the database.

8. A method for controlling a dialogue system, the method comprising:
 converting a user's speech into text;
 determining a main domain and task corresponding to the user's speech based on the text;
 determining a sub-domain associated with the main domain based on a database;
 generating an additional query instruction related to the sub-domain; and
 converting the additional query instruction into additional text,
 wherein the method further comprises:
  in response to a determination that the main domain is not related to a vehicle, determining whether there is a pre-stored upcoming schedule;
  in response to a determination that the pre-stored upcoming schedule exists, generating the additional query instruction relating to information associated with the pre-stored upcoming schedule based on the sub-domain; and
  generating a response corresponding to the user's speech and the information corresponding to the additional query instruction in association with the pre-stored upcoming schedule together.

9. The method of claim 8, further comprising:
 performing natural language recognition based on the additional text.

10. The method of claim 9, further comprising:
 determining whether the main domain is related to the vehicle; and
 determining whether the user's speech is related to performing control of the vehicle in response to a determination that the main domain is related to the vehicle.

11. The method of claim 10, further comprising performing control of the vehicle corresponding to the user's speech in response to a determination that the user's speech is related to performing control of the vehicle, wherein generating the response comprises generating the response corresponding to the additional query instruction.

12. The method of claim 11, further comprising determining whether it is necessary to provide feedback on the control of the vehicle corresponding to the user's speech.

13. The method of claim 12, wherein generating the response comprises generating feedback on the control of the vehicle and the response corresponding to the additional query instruction together in response to a determination that it is necessary to provide the feedback on the control of the vehicle corresponding to the user's speech.

14. The method of claim 10, wherein generating the response comprises generating the response corresponding to the user's speech and the response corresponding to the additional query instruction together in response to a determination that the user's speech is not related to performing control of the vehicle.

15. The method of claim 8, wherein determining the sub-domain comprises determining the sub-domain based on a priority stored in advance in the database.

* * * * *